Aug. 3, 1926.
A. W. BROWN
POTATO CUTTER
Filed June 24, 1925
1,594,996
2 Sheets-Sheet 1
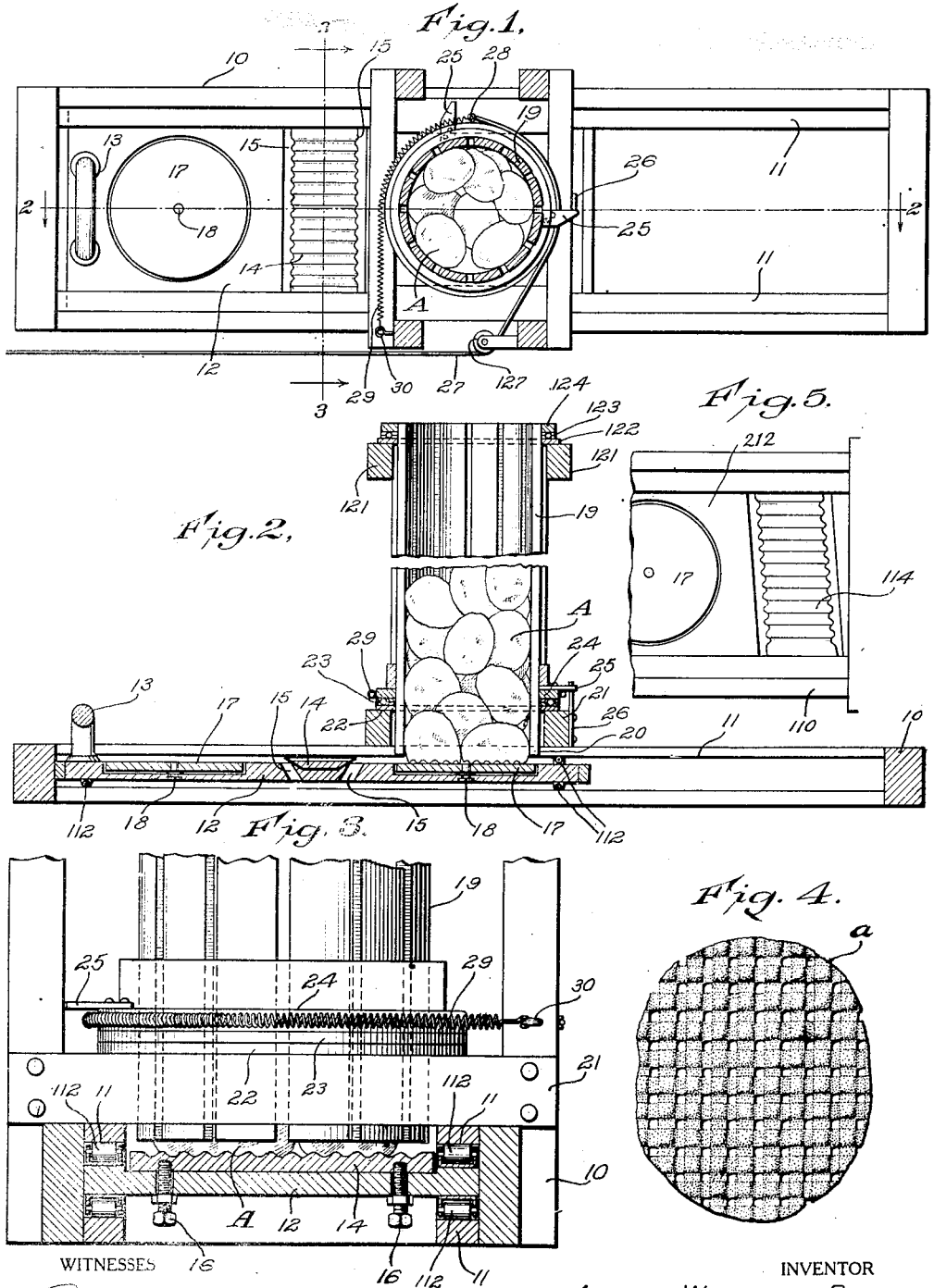
INVENTOR
ANTHONY WINCHESTER BROWN
BY
ATTORNEYS Aug. 3, 1926.

A. W. BROWN

POTATO CUTTER

Filed June 24, 1925

WITNESSES

INVENTOR
ANTHONY WINCHESTER BROWN
BY
ATTORNEYS

Patented Aug. 3, 1926.

1,594,996

UNITED STATES PATENT OFFICE.

ANTHONY WINCHESTER BROWN, OF PEEKSKILL, NEW YORK.

POTATO CUTTER.

Application filed June 24, 1925. Serial No. 39,379.

My invention relates to a means for cutting vegetables and more particularly is intended for embodiment in a cutter operable to produce a novel form of sliced potatoes.

My invention has for its object to produce sliced potatoes of a form that will make for a final cooked product having the advantage that it will not absorb moisture or not absorb it except to the minimum extent so that the product remains crisp.

A further object of the invention is to provide a method and means for producing the article referred to.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a partly sectional plan view of a potato cutter embodying my invention;

Figure 2 is a longitudinal vertical section on the line 2—2, Figure 1;

Figure 3 is a transverse vertical section on the line 3—3, Figure 1;

Figure 4 is a plan view of the finished product produced by my improved method and means;

Figure 5 is a fragmentary plan view of portions of the main frame, knife and knife frame, illustrating a slightly modified arrangement of the knife;

Figure 6:
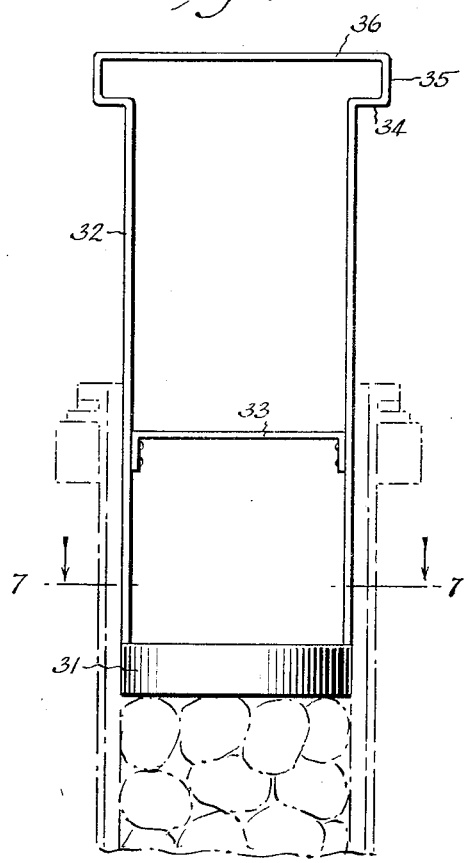
Figure 6 is a side elevation of the weighted follower employed in the hopper, said hopper being shown in dotted lines, the follower shown being omitted from Figure 2 in the interest of clearness.

In carrying out my invention in practice in accordance with the illustrated example, a suitable oblong main frame 10 is provided shown in Figures 1 to 3 or a similar frame 110 as in Figure 5. The frame 10 along the sides has longitudinal guideways 11. Slidable in the guideways 11 of the frame is a knife frame 12 having adjacent one end thereof any suitable handle 13. The numeral 14 indicates a transversely disposed knife positioned in the horizontal plane of the frame 12. It is to be observed that said knife 14 has a corrugated upper surface and at the front and back of the knife are oblique slots 15 leading downwardly through the frame 12 for the escape of a slice $a$ from a potato A. The knife is shown in the illustrated form as secured by screws 16 extending upwardly through the frame 12 as clearly shown in Figure 3, and screwing into the knife material at the under side thereof. On the frame 12 a short distance from the ends thereof are turntables 17 having suitable central pivots 18.

Mounted on the frame 10 approximately centrally thereof is a hopper 19 to hold a supply of potatoes A to be sliced. The lower end of the hopper is disposed at an opening 20 in the frame 10 so that the potatoes may pass from the hopper through frame 10 into the path of movement of the knife 14. In order that the hopper may readily be turned, the following supporting means therefor is provided: Transverse frame members 21 are disposed at opposite sides of the hopper and mounted thereon is a ring 22 on which ball bearings 23 seat, said bearings being disposed beneath a flange 24 rigid with the hopper 19. The numeral 25 indicates laterally projecting members on the hopper adapted to engage opposite sides of a stop 26, said members 25 being disposed on the hopper approximately 90° apart. For turning the hopper 19 through 90°, suitable means may be provided. I have shown manually operable means consisting of a rope or other flexible element 27 running over a pulley 127 and secured as at 28 to the hopper at the outside so that a pull on the element 27 will turn the hopper through 90° until one of the members 25 engages the stop 26. A retractile spring 29 secured at 28 to the hopper and secured as at 30 to the framework serves to restore the hopper to the original position after a turning movement under a pull exerted on the element 27. The element 27 extends to a point near the front of the device, that is to say, to a point adjacent that end of the device at which the handle 13 is located so that said element is in convenient reach of the operator of the device.

Referring to Figure 4, it will be observed that the slice $a$ is corrugated with two series of corrugations, the corrugations of one series transecting the others and in the illustrated form at right angles. The lowermost potatoes shown in the hopper, it will be seen, have corrugated under sides due to the corrugations on the knife 14. It is to be observed that said corrugations in the potatoes are shown disposed transversely of the frame 10 whereas the corrugations of the knife 14 run longitudinally of the knife frame 12 and of frame 10. If a slice be now cut from the lowermost potatoes shown in the hopper A, it will be clear that the slice will be cut with the upper surface presenting corrugations transverse to the corrugations of the lower surface. Moreover, the depth of the corrugations is such that the corrugations of one series intersect those of the other series in a manner to leave openings or perforations at the intersections of the two series of corrugations. It is to be understood that no material is removed from the slice *a* to produce the openings or perforations, said openings being due to the mode of cutting from the potato A a slice which already is corrugated to a given depth at the under side.

In order that the slice may be cut with the corrugations in each alternate slice at right angles, the hopper 19 is turned through 90° after each slice has been removed. This leaves corrugations at the under side of the potato transverse to the frame 10 so that the next cut in removing the slice will produce a second series of corrugations and the openings or perforations in the slice. The turntables 17 are for the purpose of preventing friction between the potato and the table surface in the turning of the hopper 19. The weight of the potatoes on a table 17 will cause the table to turn with the hopper. The knife 14, it will be observed, is bevelled or sharpened at each end, so that the knife cuts in both the forward and backward movements of the frame 12. By taking hold of the handle 13, frame 12 is moved forwardly so that one turntable 17 passes from beneath the potatoes in the hopper as the knife 14 arrives at the hopper to cut a slice from the lowermost potatoes. The complete stroke of the frame 12 and knife 14 toward the right-hand end of the frame in Figure 2 will bring that turntable 17 shown at the left of Figure 2 beneath the hopper. A pull is then exerted on the flexible element 27 and a turning movement thereby given to the hopper to dispose the previously produced corrugations in the lowermost potatoes transversely to the path of the knife. When the frame 12 has been moved toward the right-hand end in Figure 2, the handle 13 is released and the spring 29 restores the hopper so that always the corrugations at the under sides of the potatoes will be transverse to the path of the knife.

The particular purpose of forming openings or perforations in the slice *a* of a potato, is to facilitate the dissipation of the moisture in the potato in the cooking operation which may be done by dipping the potatoes in hot grease. A novel and advantageous characteristic of the final product, is that the corrugated and perforated slice when crisped will either not absorb moisture or will absorb it only to the minimum extent. I have found that the product produced as described retains its crisp form permanently.

In addition to the ball bearings 23 near the lower end of the hoper 19, I provide also ball bearings 123 near the upper end of the hopper. Said ball bearings 123 are at the under side of a flange 124 of the hopper between the same and a ring 122 supported by frame members 121.

To facilitate the sliding of the knife frame 12 in the frame 10 any suitable arrangement of friction rollers may be employed. I have shown rollers 112 on the frame 12 adjacent the ends to contact with the walls of the slideway 11.

In Figure 5, the main frame 110 has a knife frame 212 carrying an oblique knife 114 corrugated and formed with back and front cutting edges as in the first case. The purpose of the oblique knife is to give more of a shear cut to the vegetable.

Figure 7:
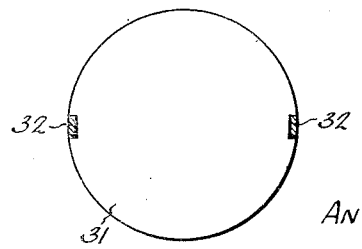
Figure 7 is a sectional plan view of the weighted follower, the section being on the line 7—7, Figure 6.

In practice, I employ a weighted follower 31 in the hopper 19 above the vegetable. The weight of said follower 31 is of disk-like shape as best seen in Figure 7. The weight is carried by vertical side bars 32 braced by a cross bar 33. At the upper end of the bars 32 are outwardly disposed shoulder members 34 adapted to rest on the top of the hopper to limit the downward movement of the shoulder and prevent its protrusion in the path of the knife. The members 34 are shown as integral with uprights 35 joined by a top cross bar 36.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A vegetable cutter having a supporting frame and including as an element a hopper mounted in said frame and adapted to hold vegetables to be sliced and open at the bottom for the protrusion of the vegetables from said bottom of the hopper, and including as a second element reciprocable cutting means one of said elements being variable in position relative to the other to cause successive movements of the cutter to cut the vegetables at different angles.

2. In a vegetable cutter, a frame, a knife mounted to be moved along said frame, a hopper adapted to hold vegetables to be sliced by said knife and open at the bottom for the protrusion of the vegetables into the path of movement of the knife, said hopper being turnable through an angle to variously present the protruding vegetables to the knife.

3. In a vegetable cutter, a frame, a knife mounted to be moved along said frame, a hopper adapted to hold vegetables to be sliced by said knife and open at the bottom for the protrusion of the vegetables into the path of movement of the knife, said hopper being turnable through an angle to variously present the protruding vegetables to the knife; together with stop means to limit the turning movement of the hopper.

4. In a vegetable cutter, a main frame, a knife frame mounted for reciprocating movement in the main frame, turntables on the knife frame, a corrugated knife disposed on said knife frame between the turntables, and a hopper adapted to hold vegetables to be sliced, said hopper being open to permit protrusion of the vegetables to the path of movement of the knife; together with means to turn said hopper when a turntable is positioned beneath the hopper.

5. In a vegetable cutter, a main frame, a hopper adapted to hold vegetables and open at the bottom to permit protrusion of the vegetables from said bottom, and a knife mounted to reciprocate in said frame, said knife having cutting edges at the front and back thereof, and having corrugations extending between said cutting edges; together with means to turn the hopper to variously present the protruding vegetables to said knife.

ANTHONY W. BROWN.